United States Patent
Wolfe et al.

[11] 3,980,220
[45] Sept. 14, 1976

[54] METHOD OF FABRICATING LARGE TITANIUM PRESSURE HULLS

[75] Inventors: Robert J. Wolfe, Arnold; Charles A. Zanis, Bowie; Louis F. Aprigliano, Annapolis, all of Md.

[73] Assignee: The United States of America as represented by the Secretary of the Navy, Washington, D.C.

[22] Filed: Dec. 5, 1974

[21] Appl. No.: 529,991

[52] U.S. Cl. .............................. 228/160; 228/175; 228/184; 228/186; 228/193; 228/221; 228/243; 228/263
[51] Int. Cl.² ................................... B23K 19/00
[58] Field of Search .................. 29/494, 497.5, 504; 228/221, 242, 243, 263, 186, 193, 160–162, 175, 184; 219/10, 53, 8.5

[56] References Cited
UNITED STATES PATENTS

| | | | |
|---|---|---|---|
| 3,025,592 | 3/1962 | Fischer et al. | 29/504 X |
| 3,148,038 | 9/1964 | Wolfe | 29/504 X |
| 3,417,461 | 12/1968 | Wells et al. | 20/504 X |
| 3,550,252 | 12/1970 | Conn et al. | 29/497.5 X |
| 3,603,759 | 9/1971 | Peacock | 219/8.5 X |
| 3,736,638 | 6/1973 | Stone | 29/497.5 X |
| 3,748,722 | 7/1973 | Moore | 29/494 X |
| 3,787,959 | 1/1974 | Moore et al. | 228/193 X |

OTHER PUBLICATIONS

Aprigliano et al. Diffusion Bonding of Alloy Titanium for Pressure Hull Fabrication, NSRDC Report 4177, Nov. 73, pp. 1–3, 13.
Holko, "Hot Press and Roll Bonding of T,–6A1–4V Bar and Sheet with Auto–Vacuum Cleaning" NASA Tech. Note. TN D–6958 (Sept. 1972).

*Primary Examiner*—Al Lawrence Smith
*Assistant Examiner*—K. J. Ramsey
*Attorney, Agent, or Firm*—R. S. Sciascia; Q. E. Hodges

[57] ABSTRACT

A method of fabricating large cylindrical sections of titanium or other metals for applications such as pressure hulls from cylindrical segments wherein mated segments are capped off and evacuated, atmospheric pressure being used to force the mating surfaces together during diffusion welding.

4 Claims, 3 Drawing Figures

METHOD OF FABRICATING LARGE TITANIUM PRESSURE HULLS

The invention described herein may be manufactured and used by or for the Government of the United States of America for governmental purposes without the payment of any royalties thereon or therefor.

BACKGROUND

The high strength-to-weight ratio and outstanding seawater corrosion resistance of titanium alloys have long been recognized and have marked titanium as an important structural material in future ocean systems. A specific application in which alloy titanium has several potential advantages over high-strength steels is in the construction of pressure hulls for deep submergence vehicles. Prior to utilizing alloy titanium for this application, however, definite advances must be made in fabrication technology to provide more economical procedures for joining titanium into structural components. Specific factors which control the economics of joining titanium alloys include the need for extreme cleanliness and careful gas shielding to prevent harmful contamination during fusion welding, the high cost of available weld filler materials (approximately $40 per pound), and the unavailability of an electrode for shielded-metal-arc welding (SMAW). Based on the above considerations, attention must focus on the development of new fabrication procedures and concepts for use in the construction of economical titanium pressure hulls. One such fabrication technique is diffusion welding, a process which has already been applied to the manufacture of relatively complex, small aerospace structural components of alloy titanium. Among the advantages of diffusion welding are the elimination of costly weld filler materials, elimination of the metallurigical inhomogenity of cast weld metal in the final assembly, improved mechanical properties across the joint, and elimination of much of the distortion and shrinkage problems inherent with fusion welding.

Diffusion welding is defined as the coalescence of two clean metal surfaces in the solid state by the application of controlled temperature and pressure. To achieve the surface condition necessary for diffusion welding, surface contaminants such as oxide films and absorbed gases must be removed and excessive surface roughness must be eliminated. Both contaminants and surface roughness act to limit the area of contact between the surfaces to be welded.

It has been proposed that the diffusion welding process in titanium alloys involves three interrelated stages. During the initial stage, surface oxides are eliminated and intimate contact is produced between the surfaces to be welded in order to form an interfacial grain boundary and a plane of microvoids at the interface. Oxide removal occurs as a result of the dissociation and dissolution of surface oxides at the welding temperature and is accelerated by the simultaneous application of pressure at the interface. Pressure also serves to eliminate surface irregularities and to establish the required interfacial contact. During the second stage, two changes occur simultaneously. The microvoids along the interface shrink, and most are eliminated by diffusion. Also, the interfacial grain boundary migrates out of the plane of the original interface to a lower energy equilibrium configuration. Pressure application is not required during this stage. The final stage of the welding process consists of eliminating voids by volume diffusion.

In the diffusion welding process outlined above, temperature selection is perhaps the most critical parameter since it determines the degree and rate of surface oxide dissociation and dissolution necessary to ensure surface cleanliness. In addition, temperature controls the yield strength and surface creep rate of the material, which in turn establish the amount of pressure required to achieve intimate surface contact. Finally, temperature controls the diffusion rate, which is critical during stages two and three of the diffusion welding process, and influences the metallurigical reactions which take place during the welding process such as phase transformations and grain growth. Temperatures ranging from 1500° to 1850° F are normally used for diffusion welding of titanium alloys. The lower temperature is approximately half the melting point of titanium, below which diffusion rates become too slow for effective bonding. Conversely, above about 1850° F beta phase grain growth can become excessive in alloy titanium and will decrease the surface creep rate and necessitate the use of higher pressures to achieve surface contact.

Development of a procedure for diffusion welding a large structural section, such as a pressure hull, requires that several major engineering problems be overcome. These are:

1. Protection of the surfaces to be diffusion welded from atmospheric contamination without the use of a large vacuum chamber.
2. Application of uniform pressure to the surfaces being diffusion welded.
3. Application of the required temperature at the interface during the diffusion welding process without the use of large controlled atmosphere heat treating furnaces.

The present invention solves the above engineering problems and thus describes a unique method for the fabrication of large titanium pressure hulls.

SUMMARY

Briefly, the present invention is a method of diffusion welding large cylindrical sections together; it can also be used to fabricate the individual sections. It comprises grinding the mating surfaces to achieve intimate contact between them, assembling the parts to be welded with their ground surfaces in contact with each other, seal welding the exterior of the joint between the ground surfaces, capping off the ends of the assembled parts to form a hollow body and evacuating the hollow body, and then diffusion welding the joint between the ground surfaces.

OBJECTS OF THE PRESENT INVENTION

Accordingly, it is an object of the present invention to provide a novel method of diffusion welding large objects.

It is a further object to provide a method of diffusion welding large objects which does not require the use of mechanical presses.

It is a further object to provide a method of diffusion welding large objects which does not require the use of a controlled-environment furnace.

Other objects and advantages of the present invention will be obvious from the following specification and accompanying drawings.

DESCRIPTION OF THE PREFERRED EMBODIMENT

Figure 1:
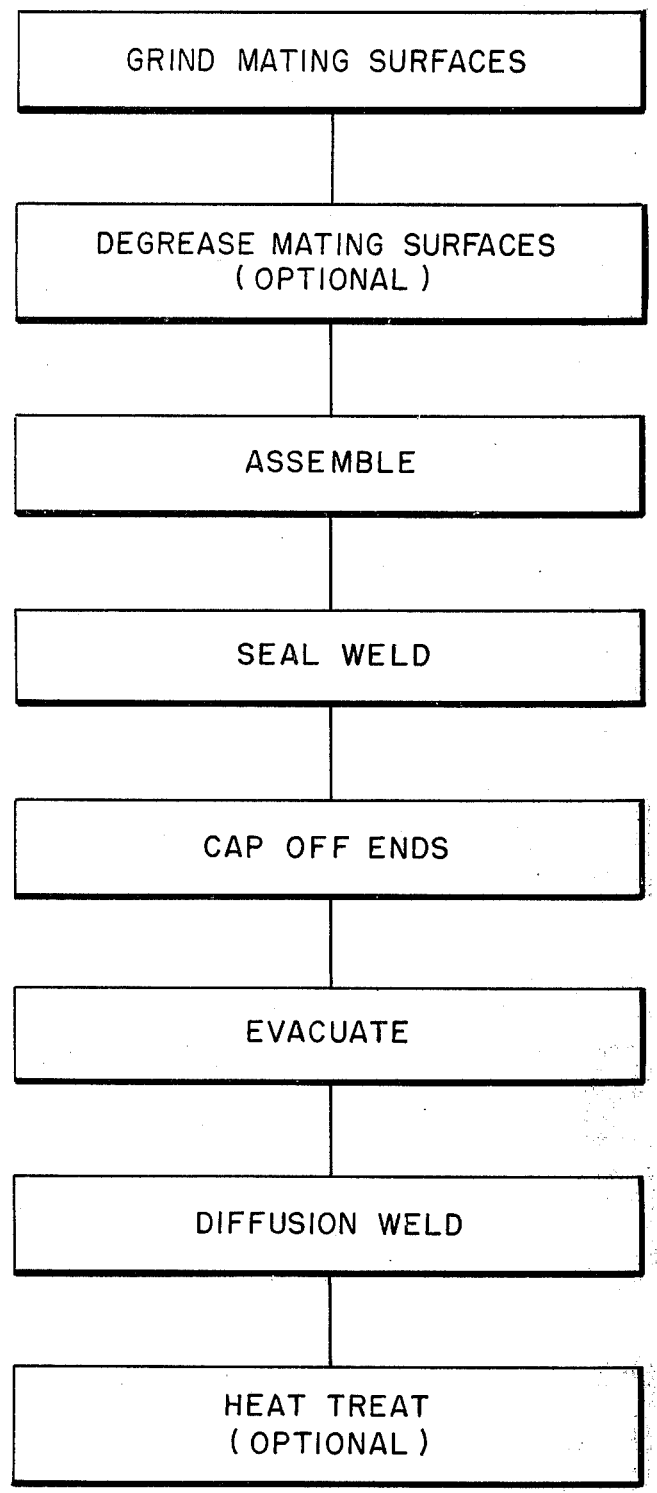
FIG. 1 summarizes the steps of the method of the present invention.
Figure 2:
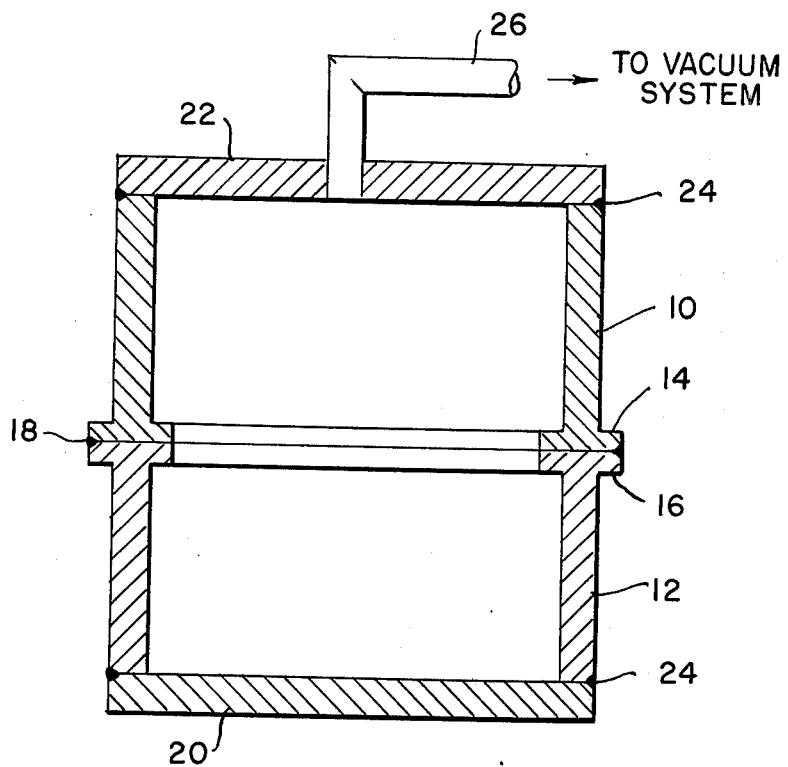
FIG. 2 is a cross section of an assembly that is to be welded according to the present invention.

The method of the present invention, which is summarized in FIG. 1, is illustrated in FIG. 2. Ring sections 10 and 12, which are to be diffusion welded together, are formed with flanges 14 and 16 at their mating surfaces. Flanges 14 and 16 are shown as being on the inside as well as the outside of the ring sections, with the inside flange being later ground off; however, the inside flange can be eliminated entirely if desired.

The mating surfaces of flanges 14 and 16 are ground flat to achieve intimate contact when placed against each other, as is well known in the diffusion welding art. If necessary, the surfaces can also be degreased. A minimum penetration seal weld 18 is then made around the periphery of the joint to isolate it from the atmosphere.

End caps 20 and 22 are then placed over the exposed ends of the ring sections to form a hollow body. These end caps are shown as having minimum penetration seal welds 24 where they join the ring sections; however, any suitable means may be used to seal the joint between the ring section and the end cap to make it air tight at the welding temperature.

A penetration 26 is next placed in one end cap and connected to a source of vacuum, and the interior of the hollow body is evacuated. The joint between the two flanges can now be welded. If the ring sections are too big to fit into a furnace, then localized heating can be applied to the joint alone to effect the weld. This localized heating can be done by means of infrared lamps, an induction heating unit, or any other desired means. Obviously, if the ring sections will fit into a furnace then the assembly can be put into the furnace. In either event the two flanges will be welded under vacuum just as if they were in a vacuum furnace.

If desired, the welded joint and adjacent material can be heat treated; this is usually not necessary, since diffusion welding does not result in the cast metal structure that is associated with fusion welding.

Figure 3:
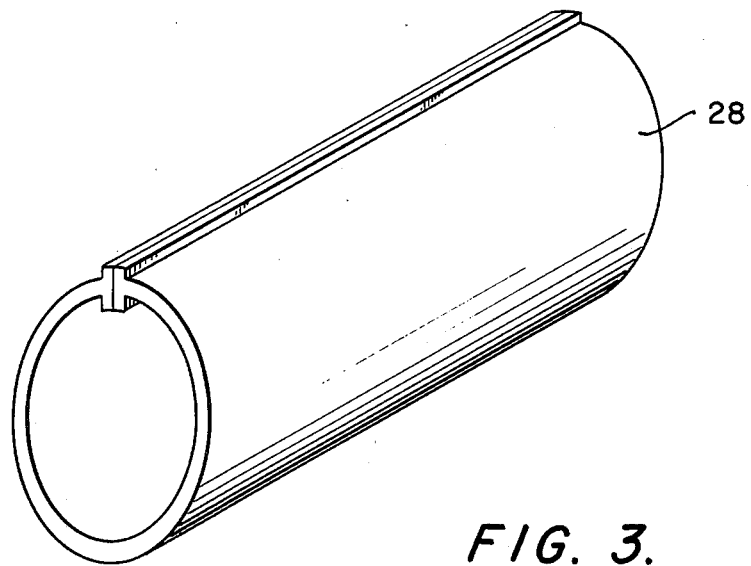
FIG. 3 shows the method of the present invention applied to the manufacture of a large cylindrical section.

FIG. 3 shows the method of the present invention used to fabricate a cylindrical section from a flat plate. A flat plate (not shown) with flanges on two parallel sides has been formed into a cylinder 28 with the flanges abutting each other. (Prior to this the flanges must be prepared as in the embodiment of FIG. 1.) The outside edge of the joint between the two flanges is then seal welded as before, and the ends capped off and the hollow body evacuated. Localized heat is again applied to the flanges, and the flanges are diffusion welded.

Contact pressures between the mating surfaces can be as high as 350 psi, depending on the ratio between the flange area and the diameter of the evacuated body and the amount of vacuum that is produced. The above conditions can be adjusted to "tailor" the contact pressure to any desired level.

B. Obviously the method of the present invention can be used for diffusion welding metals other than titanium, with a suitable change in welding temperatures.

Thus it will be seen that the present invention allows large sections to be diffusion welded without requiring the use of large vacuum furnaces, as in conventional diffusion welding.

Obviously many modifications and variations of the present invention are possible in light of the above teachings. It is therefore to be understood that within the scope of the appended claims the invention may be practiced otherwise than as specifically described.

What is claimed is:

1. The method of welding large annular sections of a homogenous material which comprises:
    preparing the mating surfaces between the sections to achieve intimate contact between the mating surfaces;
    assembling the sections with the mating surfaces in contact;
    sealing the assembled sections to form an air tight container;
    evacuating the container in the normal atmosphere to apply atmospheric pressure to the mating surfaces;
    applying heat in place in the normal atmosphere to the area adjacent the mating surfaces only to diffusion weld the sections together.

2. The method of claim 1 in which heating is inductive heating.

3. The method of claim 1 in which the sealing includes the step of minimum penetration welding at the mating surfaces and;
    attaching caps to close the open ends of the sections to form the air tight container.

4. The method of claim 3 in which each of the mating surfaces includes a flange and in which the sealing including the steps of minimum penetration welding the flanges of the mating surfaces to form an air tight container;
    and the step of removing the flange following the diffusion welding of the mating surfaces to leave a smooth surface on the welded sections.

* * * * *